(No Model.) 2 Sheets—Sheet 1.

A. W. THOMASSON & R. S. PENCE.
CLOVER HARVESTER.

No. 378,184. Patented Feb. 21, 1888.

Witnesses
Chas. L. Taylor
J. W. Garner

Inventors
A. W. Thomasson
R. S. Pence
By their Attorney
J. C. Higdon (No Model.) 2 Sheets—Sheet 2.

A. W. THOMASSON & R. S. PENCE.
CLOVER HARVESTER.

No. 378,184. Patented Feb. 21, 1888.

UNITED STATES PATENT OFFICE.

AUGUSTUS W. THOMASSON AND ROBERT S. PENCE, OF KEARNEY, MISSOURI.

CLOVER-HARVESTER.

SPECIFICATION forming part of Letters Patent No. 378,184, dated February 21, 1888.

Application filed December 10, 1886. Serial No. 221,213. (No model.)

*To all whom it may concern:*

Be it known that we, AUGUSTUS W. THOMASSON and ROBERT S. PENCE, citizens of the United States, residing at Kearney, in the county of Clay and State of Missouri, have invented a new and useful Improvement in Machines for Harvesting Seeds from Standing Grain and Grass, of which the following is a specification.

Our invention relates to an improvement in machines for harvesting the seeds from standing grain and grass; and it consists in the peculiar construction and combination of devices, that will be more fully set forth hereinafter, and particularly pointed out in the claim.

Figure 1:
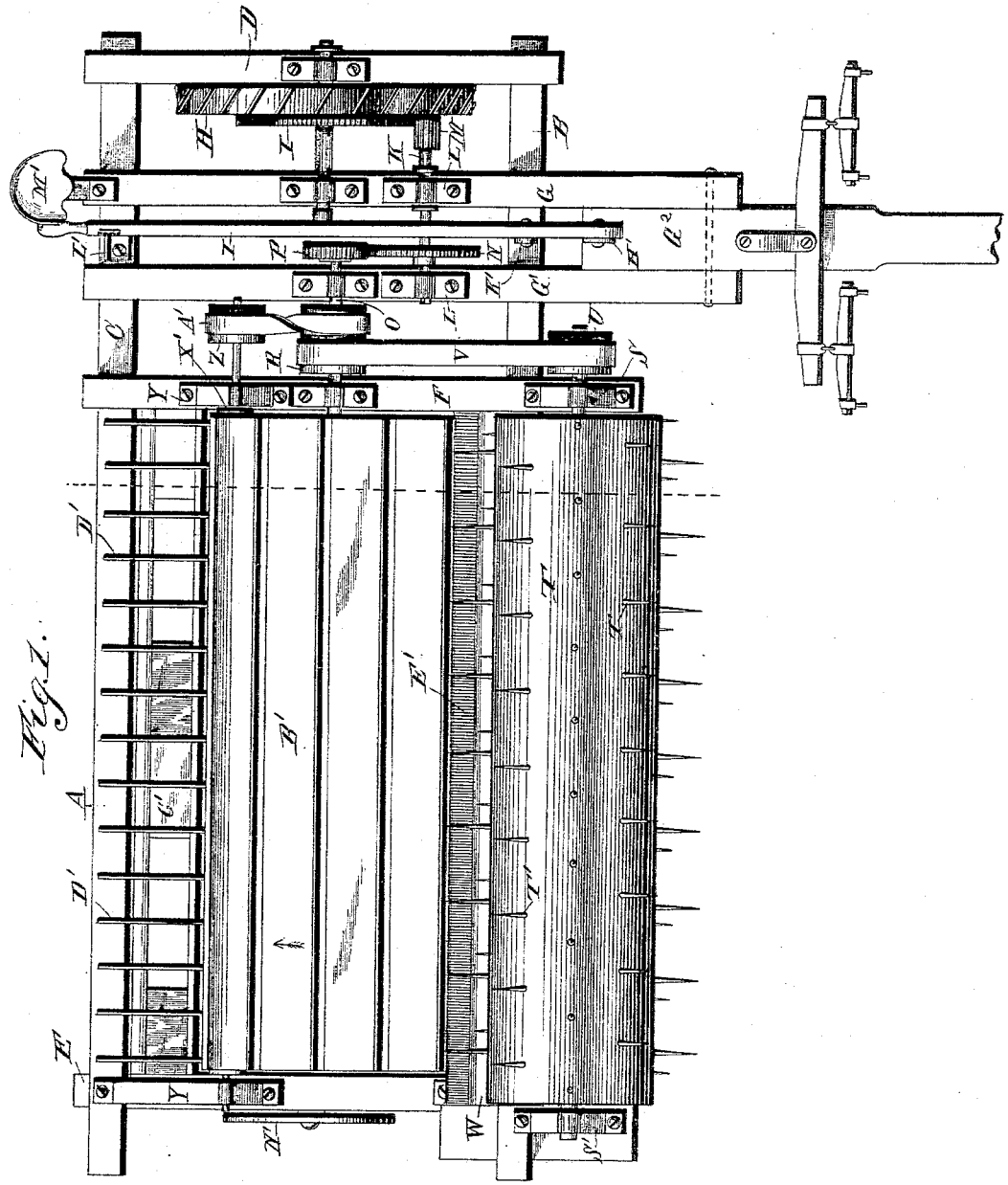
Figure 2:
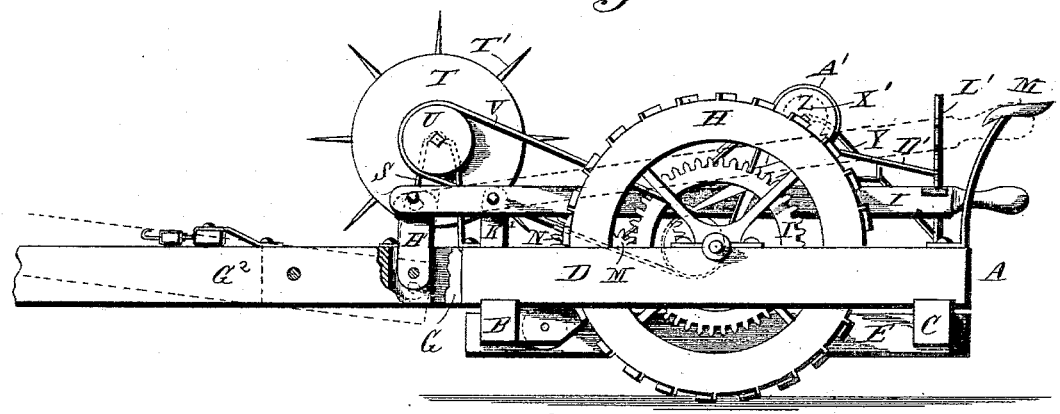
Figure 4:
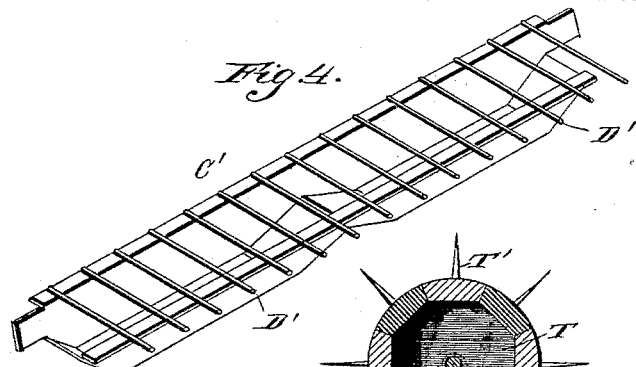
Figure 3:
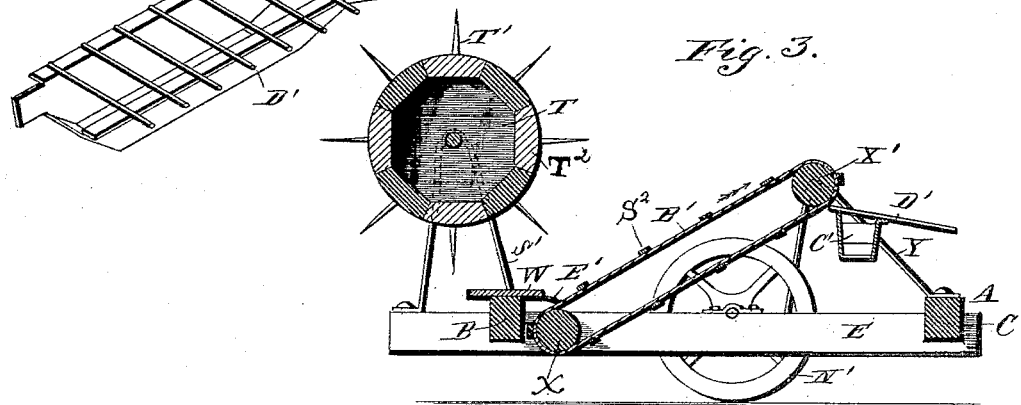
Figure 5:
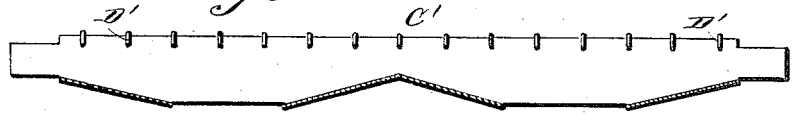

In the drawings, Figure 1 is a top plan view of a seed-harvester embodying our improvements. Fig. 2 is an end elevation of the same. Fig. 3 is a vertical longitudinal sectional view taken on line $x$ $x$ of Fig. 1. Fig. 4 is a detached perspective view of the hoppers with the cross-bars. Fig. 5 is a sectional view of the same.

A represents a rectangular frame, comprising the front and rear beams, B and C, the beam D, connecting the said front and rear beams at one end of the same and arranged on the upper sides of the said beams, and the beam E, connecting the opposite ends of the beams B and C and arranged on the lower sides thereof. At a suitable distance from the beam D and parallel therewith is a longitudinal beam, F, which is arranged on the upper sides of the beams B and C and connects the same, and arranged intermediate between the beams E F and parallel with the same and with each other is a pair of longitudinal beams, G and G'.

H represents a driving-wheel, which has a broad tread, and is provided with peripheral teeth or flanges to adapt it to rotate by frictional contact with the ground. The shaft of the said driving-wheel is journaled in bearing-boxes secured on the upper side of the beam D and the beam G, and to the said shaft or formed with the said wheel is attached a spur-wheel, I.

K represents the counter-shaft, which is journaled in bearing-blocks L, attached to the beams G and G'. On one end of the said counter-shaft is secured a spur-pinion, M, which meshes with the wheel I, and near the opposite end of the counter-shaft is attached a spur-wheel, N.

O represents a shaft which is journaled in suitable bearing-boxes secured on the beams G' and F. The outer end of the said shaft O is provided with a spur-pinion, P, which meshes with the spur-wheel N, and to the central portion of the said shaft is attached a broad pulley, R. By means of the gearing hereinbefore described the rotation of the driving-wheel can be imparted to the pulley R, as will be readily understood.

To the front end of the beam F is attached a standard S, and to the front end of the beam E is attached a standard S'. The upper ends of the said standards S and S' are provided with bearing-boxes which are arranged in line with each other and in the same horizontal plane, and in the said boxes is journaled the shaft of a rotating stripping or thrashing cylinder, T. The said cylinder is provided with a series of projecting comb-teeth, T'. The said toothed cylinder T is composed of sections or slats $T^2$, arranged parallel with the longitudinal axis of the cylinder, each slat or section being provided with a row of separate teeth, each tooth being set out of the path of its immediate neighbor.

It will be observed that the teeth upon the cylinder are separate and independent and arranged upon its periphery in spiral rows, so that each tooth will be out of the arc in which the adjoining tooth travels. This arrangement has the effect of giving the tops of the grass a rapid vibration to the right and left and backward and forward during the rotation of the cylinder, and effectually dislodges the seed from their hulls, leaving the heads or tops of the grass thoroughly gleaned of their contents after the machine has passed over.

To the inner end of the shaft of the cylinder T is attached a fixed pulley, U, which is connected to the pulley R by means of an endless belt, V.

On the upper side of the beam B, between the beam F and the standard S', is secured a horizontal platform, W, the front and rear edges of which project beyond the front and rear sides, respectively, of the beam B, the said platform being arranged below and slightly in rear of the rotating cylinder.

X represents a roller, which is journaled in suitable bearing-boxes secured to the beams E and F just in rear of the front beam, E, and X' represents a similar roller, which is journaled in bearing-boxes at the upper ends of a pair of vertical standards, Y, attached to the frame. To the inner end of the shaft of the said roller X' is attached a fixed pulley, Z, which is connected to the pulley R by a crossed belt, A'.

B' represents an endless apron, which connects the rollers X and X', the width of the said endless apron being equal to the length of the rotating comb or stripping-cylinder. The rollers X and X' and the endless apron which connects the same constitute an upwardly and rearwardly inclined endless elevator.

Supported in rear of the upper end of the endless elevator is a series of communicating hoppers or spouts, C', the lower ends of which are open and are adapted for the attachment of bags or sacks in which to collect the seeds, and rearwardly and downwardly inclined cross-bars D' are arranged on the upper sides of the said hoppers to prevent straws, sticks, or other foreign substances from entering the same. A flexible strip, E', connects the rear side of the foot-board W with the lower front side of the endless elevator, for the purpose to be hereinafter explained, and the said endless elevator is provided with a series of transverse ribs or slats, S².

G² represents a draft pole or tongue, which is pivoted between the beams G and G' near their front ends. To the rear end of the said draft pole or tongue is attached a pivoted link, H'.

I' represents a rearwardly-extending hand-lever, which is fulcrumed near its front end to a vertical arm or standard, K', which projects from the upper side of the front beam, B. The extreme front end of the said hand-lever is pivotally connected to the upper end of the link H', and the rear end of the hand-lever engages a vertical arm or rack, L', provided on one side with a series of teeth or notches to support the hand-lever at any desired vertical adjustment.

To the tongue G², in advance of its pivotal bolt, is connected the usual doubletree, to the ends of which are attached the singletrees to which the horses are hitched. A seat, M', for the driver is supported by a spring-bar, which is attached to the rear end of the beam G.

N' represents a small supporting-wheel which is journaled on the spindle O', that projects from the outer side of the beam E near the center thereof and in a line with the driving-wheel.

The operation of our machine is as follows: It is driven into a field of standing grain or grass, and as it progresses the cylinder is caused to rotate at a suitable rate of speed by being geared to the driving-wheel, and the endless elevator is caused to travel in the direction indicated by the arrow in Fig. 1. By means of the hand-lever, which is connected to the rear end of the draft tongue or pole, the driver raises or lowers the front of the frame to a suitable height, according to the height of the grain or grass, and the rapidly-rotating cylinder causes its teeth to sweep rearwardly through the heads of the grain or grass, so as to dash the same against the front edge of the platform, and as the teeth pass in rapid succession through and between the said heads they serve to effectually strip or comb the seeds therefrom. The seeds are swept rearwardly onto the flexible strip E', and from thence are conveyed by their own gravity and the vibratory motion of the said flexible strip, imparted to it by frictional contact with the endless elevator, onto the latter, by which the seeds are conveyed to the hoppers or spouts, previously described, and discharged by the same into the bags or sacks connected to the said hoppers or spouts to receive them.

Our improved harvesting-machine is adapted for stripping or combing the seeds directly from the grain or grass while it is standing in the field, thus avoiding the loss of a portion of the seeds, and also saving the labor of handling the grass or straw and thrashing the same after it has been mowed.

Having thus described our invention, we claim—

In a seed-harvester, the combination of a frame, a platform secured thereto and projecting from the front side, a rotary cylinder journaled to supports on the main frame and arranged above and slightly in advance of the platform, said rotary cylinder having a series of comb-teeth projecting beyond its periphery, which rotate rearwardly through the grain or grass and comb the seeds therefrom over the platform, an endless elevator arranged in rear of the platform and having the cross-slats secured thereto, and a flexible strip intermediate the elevator and the platform and secured at one edge to the latter, the opposite free edge of the said strip being extended into the path of the cross-slats, to be struck thereby and vibrated, substantially as described.

In testimony that we claim the foregoing as our own we have hereto affixed our signatures in presence of two witnesses.

AUGUSTUS W. THOMASSON.
ROBERT S. PENCE.

Witnesses:
PRESLEY D. ANDERSON,
JAMES L. JENNETT.